United States Patent [19]

Mertelmeier et al.

[11] Patent Number: 5,228,032
[45] Date of Patent: Jul. 13, 1993

[54] INTERCONNECTION ELEMENT FOR AN ASYNSCHRONOUS TIME-DIVISION MULTIPLEX TRANSMISSION SYSTEM

[75] Inventors: Christine Mertelmeier; Roland Wolker, both of Erlangen, Fed. Rep. of Germany

[73] Assignee: U.S. Philips Corporation, New York, N.Y.

[21] Appl. No.: 656,898

[22] Filed: Feb. 15, 1991

[30] Foreign Application Priority Data

Feb. 19, 1990 [DE] Fed. Rep. of Germany ....... 4004956

[51] Int. Cl.⁵ .............................................. H04J 3/26
[52] U.S. Cl. ...................................... 370/60; 370/94.1
[58] Field of Search ................ 370/60, 94.1, 95.1, 370/85.13, 85.14, 91, 94.2, 60.1

[56] References Cited

U.S. PATENT DOCUMENTS

| | | | |
|---|---|---|---|
| 3,742,145 | 6/1973 | Clark | 370/106 |
| 4,597,078 | 6/1986 | Kempf | 370/85.13 |
| 4,760,570 | 7/1988 | Acampora | 370/60 |
| 4,821,256 | 4/1989 | Fraser | 370/60 |
| 4,939,719 | 7/1990 | Bakka | 370/60 |
| 5,007,048 | 4/1991 | Kowalk | 370/94.1 |
| 5,033,045 | 7/1991 | Ramel | 370/94.1 |

OTHER PUBLICATIONS

IEEE, "The Knockout Switch: A Simple, Modular Architecture For High-Performance Packet Switching", by Yeh et al, pp. 0801-0808.

Primary Examiner—Douglas W. Olms
Assistant Examiner—Melvin Marcelo
Attorney, Agent, or Firm—David R. Treacy

[57] ABSTRACT

An element for conveying cells which are received on input lines (7a to d) and are destined for an output line 10. The interconnection element includes comparators (9a to d), each coupled to an input line and checking whether path identifications contained in the cells are assigned to the output line. In addition, a multiplexer arrangement (18) is present which by coupling the input lines to buffers (20a to d), uniformly distributes cells arriving during a time frame and destined for the output lines over the buffers in accordance with a predetermined sequence. The system further includes a multiplexer (21) for cyclic reading of the cells from the buffer.

15 Claims, 2 Drawing Sheets

INTERCONNECTION ELEMENT FOR AN ASYNSCHRONOUS TIME-DIVISION MULTIPLEX TRANSMISSION SYSTEM

CROSS-REFERENCE TO RELATED APPLICATIONS

This application is related to concurrently filed U.S. application Ser. No. 07/656,899 by the inventors herein.

BACKGROUND OF THE INVENTION

The invention relates to an interconnection element for an asynchronous time-division multiplex transmission system transmitting cells which are conveyed from input lines and are destined for an output line.

In the asynchronous time-division multiplex transmission system useful information components, for example, telephone, picture or sound signals, are transmitted in blocks of a fixed length. A cell having a predetermined number of bits in a serial sequence is called a block of a fixed length. Each cell consists of a header field and an information field. The header field contains inter alia the path identification for the cell. Path identification should here be understood to mean a connection identification or a path routing identification. The connection identification comprises the data on the target or subtarget for the useful information. The path routing information is added together within the system in certain transmission systems and contains data on a subtarget within the transmission arrangement. The useful information is accommodated in the information field.

Certain time intervals (time frames) are assigned to consecutive cells. The duration of such a time interval depends on the clock frequency employed for the tansmission components. If no useful information is available, idle cells, i.e. cells without useful information, are transmitted in such idle cells. Cells containing a useful information are designated useful cells.

During the transmission of the cells between subscribers, the cells pass through switching networks in which paths for the evaluation of the path identification are made. Such a switching network may be composed of a plurality of switching network blocks. Such a switching network block having a plurality of input lines and output lines is comprised of a plurality of interconnection elements. An interconnection element includes a plurality of input lines and an output line. In an interconnection element cells are then passed from an input line to an output line. On arrival of cells from a plurality of input lines during a time frame that wish to access an output line, an added bit (activity bit) is set to zero. In the opposite case this bit is set to one. In a subsequent concentrator the number of lines is reduced from N to L lines, so that when cells containing a useful information arrive at M input lines, wherein $L < M < = N$, some cells are lost. In a network (shifter) connected to the concentrator, cells which during a time frame are coming in from the concentrator and to which a bit having the value one are added, are entered into the shifter. In the shifter the cells are shifted such, that each output of the shifter supplies cells in a uniform manner. The outputs of the shifter are always connected to a buffer. The reading procedure in a shifter having, for example, eight inputs and outputs proceeds, it being assumed that five usuful cells arrive at a first time frame and four useful cells at a second time frame, in the following manner: First, the five useful cells are applied to five outputs. At the second time frame three cells are passed to the remaining three outputs which at the preceding time frame did not supply cells, the further useful cells being applied to one of the other five outputs. The reading operation is consequently controlled such, that a uniform filling of the buffers is achieved. This is expensive for this interconnection element in that a bit (activity bit) is added to control the cells and that all the cells having a message are conveyed via the concentrator. The selection of the cells destined for the output lines is only effected by the shifter. In addition, this shifter, which is an Omega network, may be blocked. To ensure that then no cells are lost, the shifter must be provided with stores, which increases the transit time of the cells through the shifter.

SUMMARY OF THE INVENTION

The invention has for its object, to provide an interconnection element for an asynchronous time-division multiplex transmission system, which can be realised with reduced circuit cost and design effort.

This object is achieved by means of an interconnection element for an asynchronous time-division multiplex transmission system transmitting cells which are conveyed from input lines and are destined for an output line, comprising comparators each coupled to an input line and checking whether path identifications contained in the cells are assigned to the output line, a multiplexer arrangement which by coupling the input lines to buffers uniformly distributes cells arriving during a time frame and being destined for the output lines over the buffers in accordance with a predetermined sequence, and a multiplexer for cyclic reading of the cells from the buffer.

With this interconnection element the cells are first applied to a comparator which checks whether the cells on the output line can be transmitted. In this situation, the cells containing useful information (useful cells) are transmitted via the output line. Cells destined for the output line are conveyed to buffers via a multiplexer arrangement. The multiplexer arrangement then effects such interconnections between input lines and buffers that the cells are applied in a predetermined sequence and with a uniform distribution to the buffers. For example, when four buffers and input lines are available, and in a first time frame there is always a cell available on a second and a third input line, the cells are always entered into first and second buffers. The cell on the second input line can then be routed to the first buffer and the cell on the third input line to the second buffer. When at the subsequent time frame a cell is always supplied on the first, third and fourth input lines, then the cell on the first input line is entered into a third buffer and the cell on the third input line is entered into a fourth buffer. The cell on the fourth input line is again conveyed to the first buffer. Thus a cyclic entering of the cells into the buffers is realised. As a result of this mode of controlling the multiplexer arrangement the cells are uniformly distributed over the buffers. Such a multiplexer arrangement is less expensive than the arrangement in the prior art interconnection element. Moreover, it is not necessary for the cells to be characterized by a bit indicating whether the message is to be routed to the output line. Only simple switching procedures are performed in the multiplexer arrangement. One cell is read from the buffer in each time frame. Idle cells, i.e. cells without a message, are not entered into the buffers. The multiplex arrangement is enabled only for those cells that are destined for the output line. In this interconnection element the cells are switched through in accordance with their arrival versus time, i.e. all the cells of a time frame are conveyed to the output line before the cells of the next time frame are applied to an output line.

In a further development of the invention it is provided that the multiplexer arrangement includes individual multiplexers in a number equal to the number of input lines, whose individual inputs are coupled to each input line and whose individual outputs are connected to a buffer. Since the number of individual multiplexers is equal to the number of input lines, the number of buffers is consequently also equal to the number of input lines. Assuming that the buffers have not been filled to capacity, no cells are lost when during a time frame cells arrive at each input line.

In addition, the multiplexer arrangement includes a control circuit which is connected to the comparators and controls the individual multiplexers such that they effect the coupling between the input lines which are each occupied by one cell and the buffers in a predetermined sequence. The comparator applies comparator signals to the control device, from which the control device determines to which input line the cells have been applied. After evaluation of the comparator signals the control device enables the number of individual multiplexers equal to the number of cells arrived during a time frame.

So as to enable a uniform filling of the buffers in the predetermined sequence, the control circuit must store the information which buffer was utilized last for reading during a time frame. At the subsequent time frame containing a cell, the control circuit enables the next buffer in the predetermined sequence for writing thereinto.

In a further development of the invention it is provided that the control circuit includes a decoder for evaluating the comparator signals, which supplies the number of cells of an evaluation circuit arriving in each time frame, which contains comparator signals, enables the buffers into which the cells are to be entered, and controls the individual multiplexers for coupling of the enabled buffers to the input lines occupied by cells.

Thus, an evaluation is made in a decoder included in the control circuit to which input lines cells have been conveyed. In response thereto, the evaluation circuit determines the number of enabled buffers and individual multiplexers effecting the coupling between an input line and a buffer.

The control circuit can also be used to control the multiplexer whose output is connected to the output line, the buffers being connected to the output line in a cyclic sequence. To that end the control circuit for controlling the multiplexer includes a modulo-n-counter, wherein n is equal to the number of buffers, and furthermore a detection circuit for enabling the counter when the buffers are filled with cells. By changing the counter content at each time frame, the counter provides a connection between a buffer and the output line. The detection circuit may receive a signal from the decoder reporting how many cells have been supplied by the input lines within a time frame.

The comparison can be effected in a comparator assigned to each input line in that the comparator checks whether the path identification is assigned to a cell stored in a register connected to each input line. When the assignment has indeed been effected, the comparator effects a change in a comparator signal it generates.

An embodiment of the invention will now be described in greater detail with reference to the accompanying drawings.

DESCRIPTION OF THE PREFERRED EMBODIMENT

The principle of an asynchronous time-division multiplex transmission system can be explained with reference to the block circuit diagram shown in FIG. 1. The signals of a terminal unit, for example, television, picture or sound signals, are segmented in a packet assembler and provided with a header field which contains a path identification. The path identification comprises the data on the target of the signals. Such a terminal unit and the packet assembler from a subscriber terminal arrangement 1. The data of such a terminal unit are transmitted within a time interval (time frame) in the form of cells. The duration of such a time frame then depends on the utilized clock frequency of a transmission component. Such cells consist of the above header field and the useful information. If no data are to be transmitted within a time frame, an idle cell is formed, i.e. a cell whose header field contains an indication that no further information will follow. Such idle cells are used to synchronize the system. The cells carrying a useful information are denoted useful cells.

Figure 1:
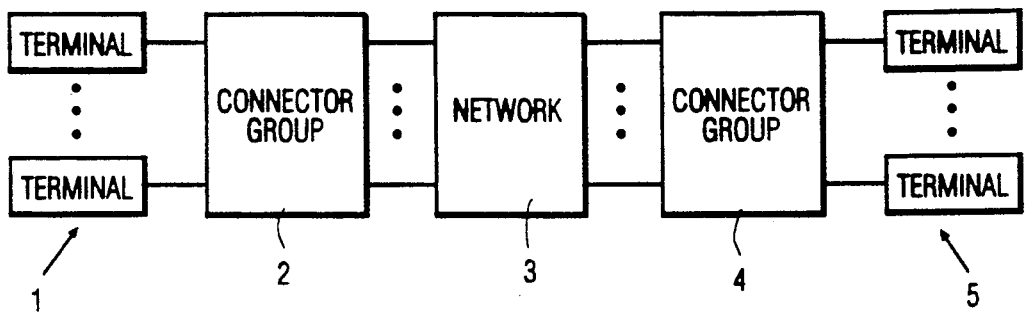
FIG. 1 is a block circuit diagram of an asynchronous time-division multiplex transmission system.

In the block circuit diagram shown in FIG. 1, the data of, for example, 64 subscriber terminal arrangements 1 are transmitted to a connector group 2 over 64 lines each having a capacity of 150 Mbit/s. The data are combined in the connector group 2 and transmitted via a lower number of lines having a higher capacity. These data can, for example, be conveyed over 16 lines each having a capacity of 600 Mbit/s. Through-putting of the data is effected in a subsequent switching network 3 formed by a plurality of switching network blocks which in their turn are formed by a plurality of interconnection elements, by evaluating the path identification by applying them to a specific output line. In this case an interconnection element consists of a circuit arrangement connected to a plurality of input lines and to an output line. The circuit arrangement or the interconnection element respectively, can determine data to be passed on via the output line connected to the interconnection element, and provide the required paths within the circuit arrangement. The switching network 3 has a plurality of lines, for example, 16 lines having a capacity of 600 Mbit/s connected to a connector group 4. The connector group 4 passes the received data on over lines to subscriber terminal arrangements 5. For this purpose, 64 lines are, for example, provided each having a capacity of 150 Mbit/s. Such a system transmits also data from the subscriber terminal arrangement 5 to the subscriber terminal arrangement 1.

Figure 2:
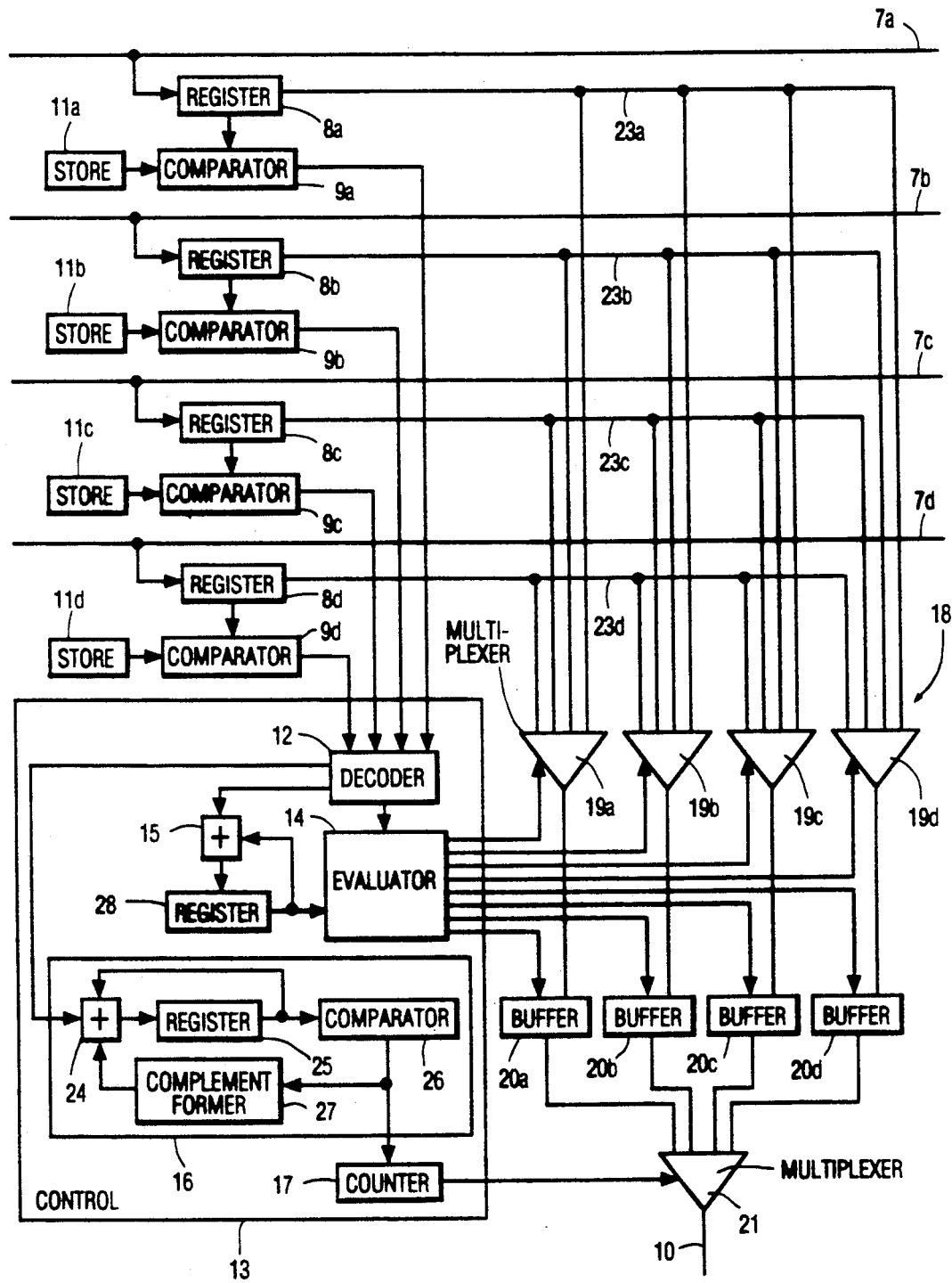

FIG. 2 shows an interconnection element which is part of a switching network. The interconnection element is connected to four input lines 7a to d. A register 8a to d is connected to each input line 7a to d. Cells applied via the input lines are stored in each register. A comparator 9a to d connected to each register compares the path identification of a cell stored in the registers 8a to d to the address of an output line 10, stored in always an address store 11a to d. Path identification is here understood to mean the path routing information which contains data on a sub-target within a transmission arrangement. The output of each comparator 9a to d is connected to a decoder 12 which is part of a control circuit 13. The decoder 12 which decodes comparator signals supplied by the comparators 9a to d applies signals to an evaluation circuit 14, an adder 15 and a detection circuit 16, which are all part of the control circuit 13. In addition, the control circuit 13 includes a register 28, whose input is connected to the output of the adder 15 and whose output is connected to a further input of the adder 15 and the evaluation circuit 14. The detection circuit 1 enables a modulo-4-counter, which also is part of the control circuit 13.

The control circuit 13 belongs to a multiplexer arrangement 18, which also includes four individual multiplexers 19a to d. Ech multiplexer 19a to d has four inputs each connected to an output of the registers 8a to d via lines 23a to d. The individual multiplexers 19a to d whose outputs are each connected to the input of a buffer 20a to d, are controlled by the evaluation circuit 14. The buffers 20a to d are FIFO's. The buffers must be dimensioned such that overflow is substantially impossible. The storage capacity of the FIFO's can be derived by traffic simulation of the interconnection element. The lines outgoing from the buffers 20a to d lead to the inputs of a multiplexer 21, which is controlled by the counter 17 and alternately connects the different incoming lines to the output line 10.

It should be noted that for the sake of clarity the lines shown in FIG. 2 are represented as one line, although they partially consist of a plurality of parallel lines. Also the clock pulse lines and clock generators required for the control of the individual digital circuit elements are not shown.

Figure 3:
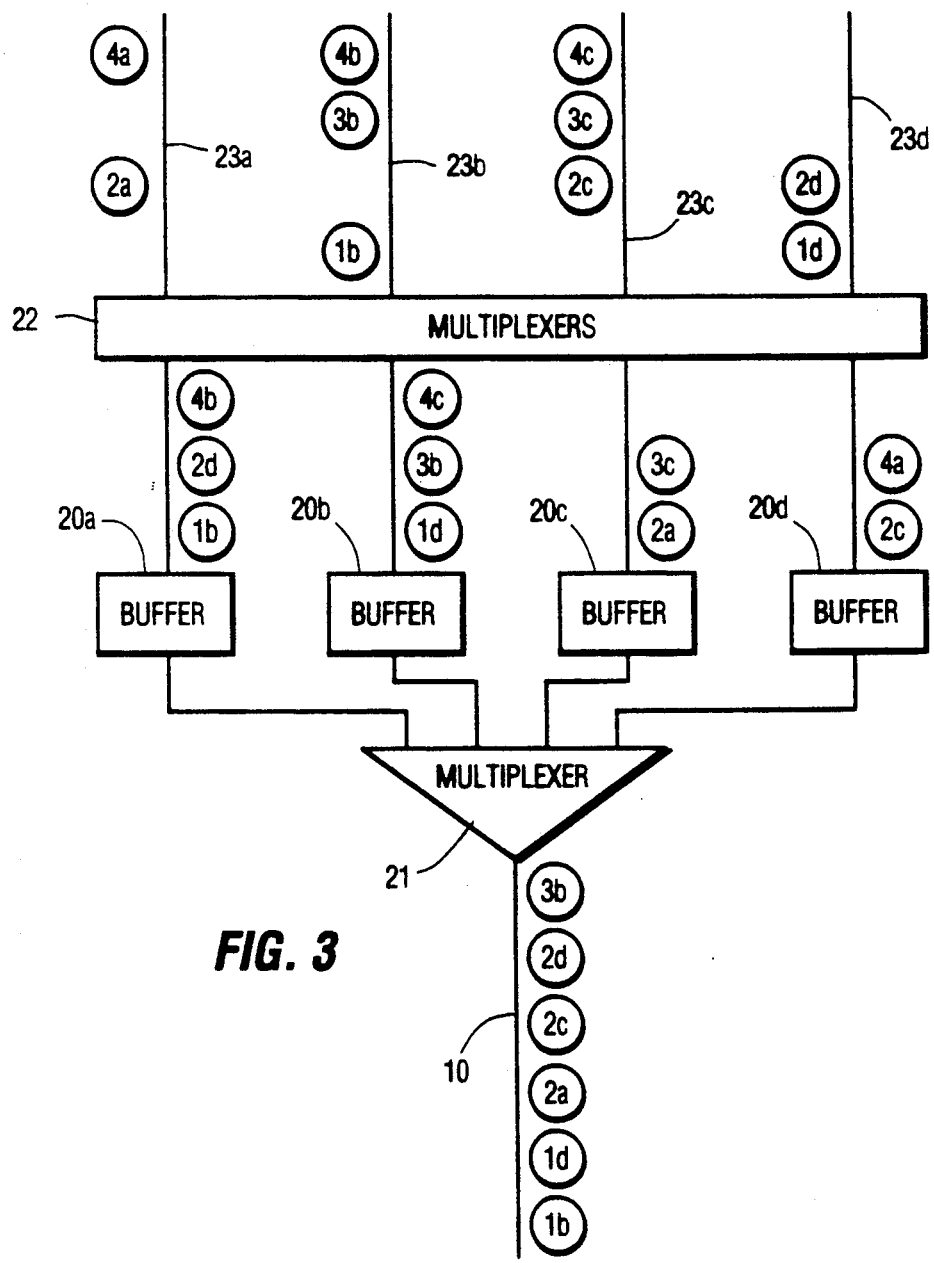
FIG. 2 is a simplified representation of an interconnection element and FIG. 3 shows an example for the processing of cells arriving in the interconnection element on the input lines.

The mode of operation of the interconnection element of FIG. 2 will now be described in greater detail with reference to FIG. 3. In FIG. 3 the four individual multiplexers 19a to d are shown as one single block 22 for the sake of clarity. The lines 23a to 23d outgoing from the registers 8a to d lead to the block 22. The four outputs of the block 22 are coupled to the buffers 20a to d. The four outputs of the buffers 20a to d are connected to the four inputs of the multiplexer 21 whose outputs are connected to the output line 10.

The multiplexer arrangement 18 only conveys cells containing a useful information (useful cells) to the output line 10. Consequently, no idle cell is applied to the output line 10. If no useful cells which can be applied to the output line 10 are available any more in the buffers, an idle cell generator, not shown, produces idle cells which are conveyed to the output line 10.

By way of explanation, let it be asumed that during a first time frame useful cells containing a message, which are designated cells 1b and 1d, arrive via the lines 23b and d, the figure denoting the respective time frame and the letter the respective line to which the cell is applied. The cell 1b is conveyed by the multiplexer arrangement 18 (or block 22) to the buffer 20a. To that end, the individual multiplexer 19a connects the output of the register 8b to the input of the buffer 20a. The cell 1d is entered into the buffer 20b, for which the individual multiplexer 19b connects the output of the register 8d to the input of the buffer 20b. Let it be assumed that during the subsequent time frame a cell 2a arrives on the line 23a, a cell 2c on the line 23c and a cell 2d on the line 23d. The cell 2a is entered into the buffer 20c and the cell 2c into the buffer 20d. The cell 2d is entered into the buffer 20a again. During the second time frame the cell 1b has been conveyed from the buffer 20a to the output line 10 via the multiplexer 21. For example, during a third time frame a cell 3b will be routed via the line 23b and a cell 3c via the line 23c. The cells 3b and the cell 3c are entered into the buffers 20b and 20c. The cell 1d is meanwhile conveyed from the buffer 20b to the output line 10. During a fourth time frame cells 4a, 4b and 4c must arrive at the lines 23a, 23b and 23c. The cells 4a and 4c are entered into the bufers 20d, 20a and 20b. In the meantime the cell 2a has been applied to the output line 10.

Due to this manner of filling, the cells are uniformly distributed over the buffers, i.e. the buffers are utilized optimally. In the example shown in FIG. 3, the buffers are filled in a predetermined sequence. This means that a cell fed forward on the line 23a is first entered into the buffer 20a and a cell on the line 23b into the buffer 20b. The sequence has consequently been determined such, that the cells are first entered into the buffers which are at the lefthand side of the drawing. The cell which in the subsequent time frame is nearest in the drawing to the line 23a is thus entered into the buffer which in the last time frame was the buffer to be filled next.

The control circuit 13 used to control the individual multiplexers 19a to d, the buffers 20a to d and the multiplexer 21 decodes in the decoder 12, on which input lines 7a to d cells have been received. For that purpose, the decoder 12 receives comparison signals from the comparators 9a to d. The comparison signal from a comparator may have a low signal state in the event, for example, of an idle cell or a cell destined for a different output line, and a high signal state for a cell destined for the output line 10. A condition is that the buffers 20a have not been filled with cells already. The decoder 12 informs the evaluation circuit 14 via which input lines 7a to d cells have arrived. Let it be assumed, that cells were received via each input line 7a to d. In response thereto, the individual multiplexer 19a couples the line 23a to the buffer 20a, the individual multiplexer 19b the line 23b to the buffer 20b, the individual multiplexer 19c the line 23c to the buffer 20c and the individual multiplexer 19d the line 23d to the buffer 20d. If, for example, no cells are available on the input lines 7a and 7c, then the individual multiplexer 19a does not couple the line 23a to the buffer 20a but the line 23b to the buffer 20a and the individual multiplexer 19b couples the line 23d to the buffer 20b. The individual multiplexers 19c and d are not operated.

During the write procedure of the buffers 20a to d the evaluation circuit 14 evaluates a signal it has received from the register 28, provided the register 28 contains the value zero. The decoder 12 supplies the adder with the number of cells per time frame. Consequently, at the first time frame the content of the register 28 is added in the adder 15 to the number of cells received and the result is stored in the register 28. At the subsequent time frame the evaluation circuit is informed by the content of the register 28, which buffer was filled last. As the adder is a modulo-4-adder, overflow occurs when the result of the addition exceeds three. Three cells were, for example, entered during a first time frame and two cells during a second subsequent time frame; then the result of the adding operation is one. From this value the evaluation circuit learns that at the last time frame the buffer 20a was filled last, since the buffers 20a to 20d are filled in a cyclic sequence. Thus, when no buffer has been filled, the buffer storage sequence is that first the buffer 20a, then the buffer 20b, then the buffer 20c and finally the buffer 20d are operated.

The detection circuit 16 and the modulo-4-counter are provided for the control of the multiplexer 21. The detection circuit 1 comprises an adder 24, which receives a signal from the decoder 12, a register 25, a comparator circuit 2 and a complement former 27. The output of the adder 24 is connected to the input of the register 25 whose output is connected to the comparator circuit 2 and to a further input of the adder 24. The output of the comparator circuit 2 is connected to the counter 17 and to the input of the complement former, which has its output connected to a further input of the adder 24.

When no cell is available in the buffers 20a to d, then a content zero is stored in the register 25. The adder 24 receives from the decoder 12 the number of cells to be stored again in the buffers 20a to d. The adder adds the number of cells to be stored to the content of the regsiter 25. The result of the addition is stored in the regisiter 25. In the comparator circuit 26 it is checked whether the number in the register 25 exceeds zero. If so, an addition to the number "−1" is also effected in the subsequent time frame with the aid of the complement former 27. The counter 17 also receives from the comparator circuit 2 the information that a number greater than zero has been stored in the register 25. In response thereto, the counter 17 so drives the multiplexer 21, that it switches from one input to the next. The buffer 20a is, for example, connected to the output line 10 during a first time frame. The control circuit of the modulo-4-counter provides a connection between the buffer 20b and the output line 10. In this manner the cells are delivered in a cyclic manner from the buffers 20a to d.

With the interconnection element which is here shown, for the sake of simplicity, with four input lines, the number of input lines may be much larger.

We claim:

1. An asynchronous time-division multiplex transmission system having a plurality of input lines; an output line for transmitting cells containing path identification; and an interconnection element for conveying cells from said input lines to said output line, said element comprising a corresponding plurality of comparators each coupled to a respective input line for checking whether path identification contained in a cell received on that input line is assigned to said output line; and a plurality of buffers,
   characterized by comprising a first multiplexer arrangement including a plurality of first multiplexers equal in number to said plurality of input lines; each first multiplexer having a corresponding plurality of inputs connected respectively to each input line, and an output connected to a respective buffer, for coupling said input lines to said buffers for uniformly distributing only said cells assigned to said output line in accordance with a predetermined sequence, and
   a second multiplexer for cyclic reading of cells from said buffers.

2. A time-division multiplex transmission system as claimed in claim 1, characterized in that the comparator (9a to d) assigned to each input line (72 to d) checks whether the path identification of a cell, stored in a register (8a to d) connected to each input line, is assigned to the output line (10) and effects a change in a comparator signal it has generated, when the assignment has indeed been effected.

3. A time-division multiplex transmission system as claimed in claim 1, characterized in that the first multiplexer arrangement (18) includes a control circuit (13) which is connected to the comparators (9a to d) and controls the individual first multiplexers (19a to d) in such a manner that they effect the coupling between the input lines (7a to d) which each carry a cell, and the buffers (20a to d) in a predetermined sequence.

4. A time-division multiplex transmission system as claimed in claim 3, characterized in that the control circuit (13) stores which buffer (20a to d) was used last during a time frame, and, at the next time frame which contains a cell, enables the next buffer of the predetermined sequence for entering a cell thereinto.

5. A time-division multiplex transmission system as claimed in claim 4 characterized in that the control circuit (13) includes a decoder (12) for evaluating the comparator signals, which applies the number of incoming cells to an evaluation circuit (14), which
   receives comparator signals,
   enables the buffers (20a to d), into which the cells are to be entered, and
   controls the individual first multiplexers (19a to d) for coupling the enabled buffers to the input lines (7a to d) on which cells are present.

6. A time-division multiplex transmission system as claimed in claim 5, characterized in that under the control of the control circuit (13) the second multiplexer (21) connects the buffers (20a to d) in a cyclic sequence to the output line (10).

7. A time-division multiplex transmission system as claimed in claim 6, characterized in that the control circuit (13) for controlling the second multiplexer (21) is a modulo-n-counter (17), wherein n is equal to the number of buffers (20a to d), which includes a detection circuit (16) for enabling the counter when the buffers are filled with cells and, by changing its counting content provides a connection between a buffer and the output line (10) at each time frame.

8. A time-division multiplex system as claimed in any one of Claims 3, 4, 5, 6 or 7, characterized in that the comparator (9a to d) assigned to each input line (7a to d) checks whether the path identification of a cell stored in a register (8a to d) connected to each input line, is assigned to the output line (10) and effects a change in a comparator signal it has generated, when the assignment has indeed been effected.

9. A time-division multiplex transmission system as claimed in claim 3, characterized in that under the control of the control circuit (13) the second multiplexer (21) connects the buffers (20a to d) in a cyclic sequence to the output line (10).

10. A time-division multiplex transmission system as claimed in claim 9, characterized in that the control circuit (13) for controlling the multiplexer (21) is a modulo-n-counter (17), wherein n is equal to the number of buffers (20a to d), which includes a detection circuit (16) for enabling the counter when the buffers are filled with cells and, by changing its counting content provides a connection between a buffer and the output line (10) at each time frame.

11. A time-division multiplex transmission system as claimed in claim 10, characterized in that the comparator (9a to d) assigned to each input line (72 to d) checks whether the path identification of a cell, stored in a register (8a to d) connected to each input line, is assigned to the output line (10) and effects a change in a comparator signal it has generated, when the assignment has indeed been effected.

12. An interconnection element for an asynchronous time-division multiplex transmission system having a plurality of input lines; an output line for transmitting cells containing path identification; a corresponding plurality of comparators each coupled to a respective input line for checking whether path identification contained in a cell received on that input line is assigned to said output line; and a plurality of buffers, characterized by comprising a first multiplexer arrangement including a plurality of first multiplexers equal in number to said plurality of input lines; each first multiplexer having a corresponding plurality of inputs connected respectively to each input line, and an output connected to a respective buffer, for coupling said input lines to said buffers for uniformly distributing only said cells assigned to said output line in accordance with a predetermined sequence, and a second multiplexer for cyclic reading of cells from said buffers.

13. An element as claimed in claim 12, characterized in that the comparator (9a to d) assigned to each input line (7a to d) checks whether the path identification of a cell, stored in a register (8a to d) connected to each input line, is assigned to the output line (10) and effects a change in a comparator signal it has generated, when the assignment has indeed been effected.

14. An interconnection element for an asynchronous time-division multiplex transmission system having a plurality of input lines; an output line for transmitting cells containing path identification; a corresponding plurality of comparators each coupled to a respective input line for checking whether path identification contained in a cell received on that input line is assigned to said output line; and a plurality of buffers, characterized by comprising a first multiplexer arrangement for coupling said input lines to said buffers for uniformly distributing cells assigned to said output line in accordance with a predetermined sequence, comprising a control circuit and a plurality of first multiplexers equal in number to said plurality of input lines; each first multiplexer having a corresponding plurality of inputs connected respectively to each input line, and an output connected to a respective buffer; said control circuit being connected to said comparators, and controlling said first multiplexers to couple between each of said input lines which carries a cell, and the respective buffer, in a predetermined sequence, and a second multiplexer for cyclic reading of cells from said buffers.

15. An element as claimed in claim 14, characterized in that the control circuit (13) stores which buffer (20a to d) was used last during a time frame, and, at the next time frame which contains a cell, enables the next buffer of the predetermined sequence for entering a cell thereinto.

* * * * *